United States Patent
Li et al.

(10) Patent No.: US 6,272,432 B1
(45) Date of Patent: Aug. 7, 2001

(54) SYSTEM AND METHOD FOR CORRECTING STAR TRACKER LOW SPATIAL FREQUENCY ERROR IN STELLAR-INERTIAL ATTITUDE DETERMINATION SYSTEMS

(75) Inventors: Rongsheng Li, Hacienda Heights; Yeong-Wei A. Wu, Rancho Palos Verdes; Douglas H. Hein, Los Angeles, all of CA (US); Garry Didinsky, Niles, IL (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/309,034

(22) Filed: May 10, 1999

(51) Int. Cl.[7] .............................. G01C 21/02; B64G 1/36
(52) U.S. Cl. ......................... 701/222; 701/221; 244/171
(58) Field of Search ................................... 701/220, 221, 701/222, 13; 244/164, 171

(56) References Cited

U.S. PATENT DOCUMENTS

| | | | |
|---|---|---|---|
| 4,823,626 | * | 4/1989 | Hartmann et al. .................... 701/220 |
| 6,047,226 | * | 4/2000 | Wu et al. ................................ 701/13 |
| 6,053,455 | * | 4/2000 | Price et al. ........................... 244/169 |

OTHER PUBLICATIONS

Wu et al, "Stellar Inertial Attitude Determination for LEO Spacecraft", Proceedings of the 35th conference on Decision and Control, vol. 3, pp. 3236–3244, Dec. 1996.*

Jones, B., "Attitude Determination Concepts for the Space Station Freedom", Position Location and Navigation Symposium, IEEE Plans '90, pp. 94–101, 1990.*

* cited by examiner

Primary Examiner—Ian J. Lobo
(74) Attorney, Agent, or Firm—T. Gudmestad

(57) ABSTRACT

A system and method of estimating the attitude of a spacecraft compares a three-axis inertial-based estimate of spacecraft attitude to a stellar-based estimate of the spacecraft attitude. A Kalman filter having some states associated with low spatial frequency errors compares the stellar-based attitude estimate to the inertial-based estimate of attitude and apportions total attitude error into two time varying matrices. A first time varying matrix is associated with star tracker low spatial frequency errors, a second time varying matrix is associated with gyro bias errors and attitude errors. The time varying matrices are used to apply corrective feedbacks to the stellar-based attitude estimate and the inertial-based estimate of spacecraft attitude, and are adaptively adjusted to minimize total estimated attitude error.

14 Claims, 3 Drawing Sheets

SYSTEM AND METHOD FOR CORRECTING STAR TRACKER LOW SPATIAL FREQUENCY ERROR IN STELLAR-INERTIAL ATTITUDE DETERMINATION SYSTEMS

BACKGROUND OF THE INVENTION (a) Field of the Invention

The present invention relates generally to spacecraft or satellite attitude determination systems and, more particularly, to a method and apparatus for correcting star tracker low spatial frequency errors to improve attitude determination performance in stellar-inertial attitude determination systems.

(b) Description of Related Art

The term attitude is used to describe the orientation of an object with respect to a reference orientation. Attitude is of particular interest in satellite or spacecraft operations. For example, if a satellite is used in a communications application it is necessary that the satellite be oriented in the proper direction to receive and/or transmit relevant information for the communication link.

The attitude of a satellite is determined by computations based on the output of sensors located on the satellite. Gyros and object trackers (such as star trackers, sun sensors, and earth sensors) are two types of sensors that may be used in attitude determination systems. In general, gyros are used to determine the rate at which the spacecraft is moving, and star trackers are traditionally used to provide an absolute reference for spacecraft attitude. By integrating gyro output, spacecraft attitude may be determined dynamically with respect to a known attitude provided by the star trackers. The use of gyros in conjunction with star trackers is commonly referred to as a stellar-inertial attitude determination system.

Object trackers such as star trackers, earth sensors, or sun sensors are used to determine the orientation or attitude of the satellite with respect to the objects being tracked. Star trackers commonly use a CCD array to measure heat or light emitted from the tracked object. Typically, satellites use an ephemeris or star catalog system to determine the location of the objects being tracked with respect to the earth. An ephemeris or star catalog system uses a table containing the coordinates of a celestial body at a number of specific times during a given period. Using ephemeris techniques and object trackers, spacecraft attitude with respect to the earth can be determined.

Star trackers measure the positions of stars in the star tracker field of view (FOV). Several types of errors typically corrupt star tracker position measurements, thereby resulting in attitude determination errors. These star tracker errors can be generally attributed to temporal noise (that changes over time), high spatial frequency (HSF) errors that change rapidly as stars move across the star tracker FOV, and low spatial frequency (LSF) errors that change slowly as stars move across the star tracker FOV.

Temporal noise is typically uncorrelated over time and may be heavily attenuated using a standard six-state Kalman filter, which is generally used in spacecraft attitude determination systems. Similarly, HSF errors exhibit rapid variations, even when the spacecraft moves relatively slowly (e.g., as with satellites in geosynchronous orbit), because HSF errors typically arise from variations between adjacent pixels (i.e., one cycle per pixel) within a CCD-based star tracker, for example. Such HSF errors are also heavily attenuated using a standard six-state Kalman filter.

LSF errors are typically caused by widely known non-ideal star tracker characteristics such as CCD array unevenness, optical deformation, effective focal length degradation and charge transfer efficiency degradation. As stars move across the star tracker FOV the error introduced by LSF errors changes very slowly, particularly if spacecraft moves at a slow rate (e.g., as with a satellite in geosynchronous orbit). Thus, these LSF errors cannot be effectively filtered out or compensated for using the standard six-state Kalman filter because they fall within the operating bandwidth of the filter.

SUMMARY OF THE INVENTION

The present invention provides a method and apparatus for correcting star tracker LSF errors in stellar-inertial attitude determination systems. The invention may be embodied in an attitude control/measurement system for estimating the attitude of a spacecraft. The system has at least three inertial sensors and at least one stellar position sensor, which are all coupled to a digital filter. The digital filter receives attitude information from the stellar position sensor and compares it with attitude information derived from the inertial sensors. The filter produces at least some corrective data signals representing LSF errors. The system corrects the stellar based attitude information using the corrective data signals that represent LSF errors.

In accordance with one aspect of the present invention, a system for correcting LSF errors has three inertial sensors and a stellar position sensor, both of which are in communication with a digital filter. The digital filter receives a stellar-based attitude information derived from the stellar position sensor and inertially-based attitude information derived from the inertial sensors. The filter compares the stellar-based attitude information to the inertially-based attitude information to produce corrective data. At least some of the corrective data is used to correct the stellar-based attitude information.

In accordance with another aspect of the present invention, a method of correcting LSF errors includes the steps of comparing inertially-based and stellar-based attitude information to determine a total attitude error, generating at least two coefficient matrices based on the total attitude error, receiving stellar position information and correcting the stellar position information using a first one of the coefficient matrices, receiving inertial information and correcting the inertial information using a second one of the coefficient matrices, propagating an attitude using the corrected inertial information to generate a propagated attitude estimate, and correcting the propagated attitude estimate using the second coefficient matrix.

The invention itself, together with further objects and attendant advantages, will best be understood by reference to the following detailed description, taken in conjunction with the accompanying drawings.

DESCRIPTION OF THE PREFERRED EMBODIMENTS

Conventional attitude determination systems may generate an attitude error estimate by comparing an inertial-based attitude derived from gyros and a stellar-based attitude derived from star-trackers. Typically, a six-state Kalman filter, using processing algorithms that are well known to those skilled in the art, apportions the total estimated attitude error to gyro bias errors and traditional attitude errors. The six states of the Kalman filter correspond to three gyro bias errors (i.e., one for each gyro) and three attitude errors (i.e., one for each of three orthogonal axes). By apportioning the total attitude error into six categories or sources of error, these conventional systems can apply appropriate corrective feedbacks to improve the accuracy of the final attitude output signal. Portions of the total error actually arising from sources that are not included in the six conventional error categories, such as star tracker spatial errors, will be incorrectly attributed to one of the six categories, thereby degrading the accuracy of the final attitude output.

Conventional attitude determination systems include many of the basic hardware and processing blocks that will be discussed in connection with an attitude determination system 10 (shown in FIG. 1), which embodies aspects of the present invention. Although many of the basic functions shown in FIG. 1 are well-known to those skilled in the art, the attitude determination system 10 includes novel functionality that is not found in conventional attitude determination systems.

Figure 1:
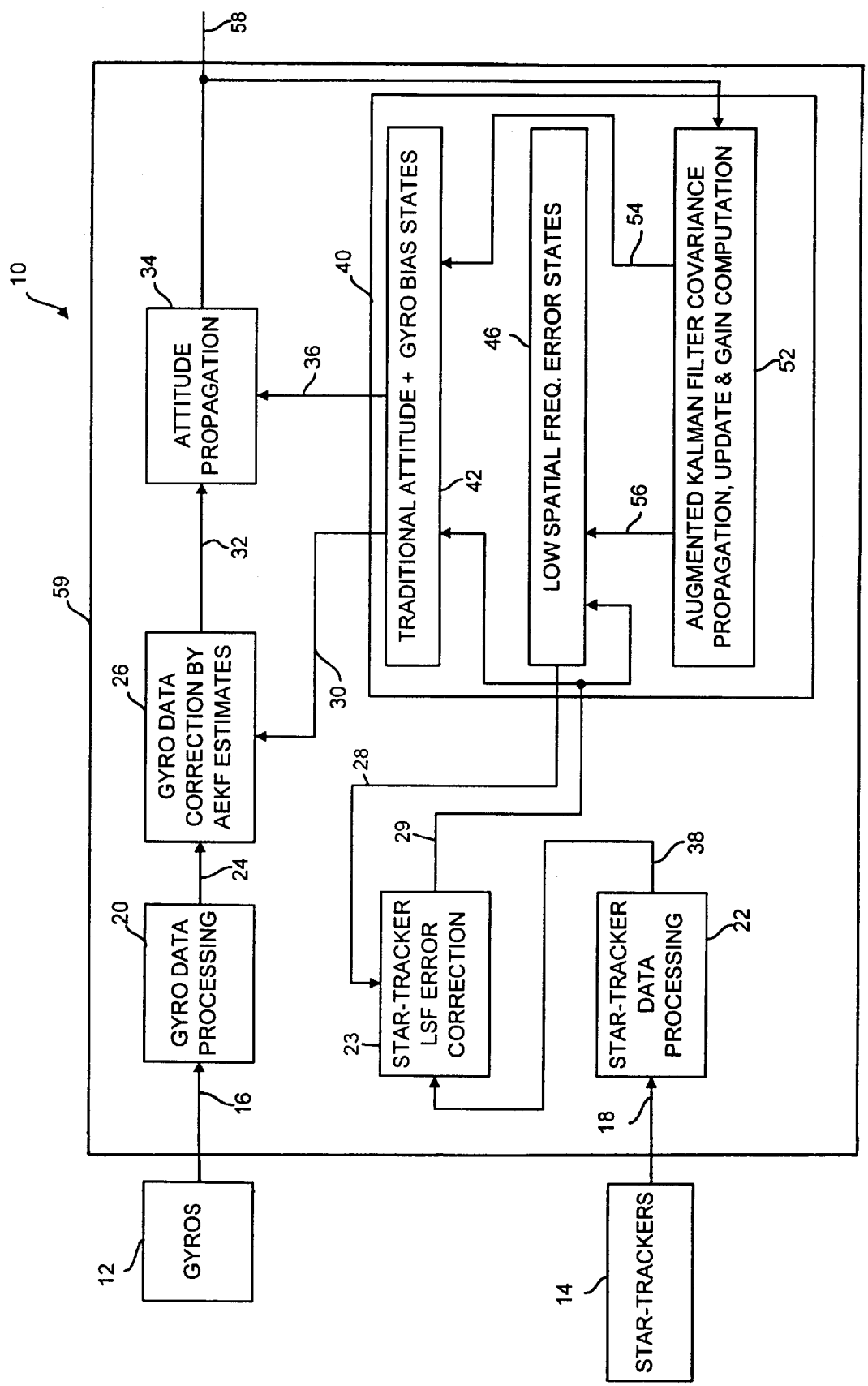
FIG. 1 is a block diagram of an attitude control system embodying aspects of the present invention.

The embodiment of the present invention shown in FIG. 1 augments a standard six-state Kalman filter to include additional filter states representing star tracker LSF errors. As a result, the attitude determination system 10 can generate corrective feedbacks for star tracker LSF errors that are not corrected for in conventional systems. By augmenting the Kalman filter to include star tracker LSF errors, the attitude determination system 10 apportions total attitude error into a more inclusive group of actual error sources (i.e., star tracker LSF errors, gyro bias errors, and attitude errors). Thus, the present invention can greatly improve the determination of spacecraft attitude.

The attitude determination system 10 is preferably implemented on board a spacecraft (not shown) and includes a gyros sub-system 12, a star-tracker sub-system 14, and a processing/control sub-system 59. The processing/control sub-system 59 receives inputs from the gyros 12 and the star-trackers 14, processes these inputs in accordance with the present invention, and provides corrected attitude data 58 that preferably represents the attitude of the spacecraft.

In operation, the control flow through the various sub-systems and process blocks of the attitude determination system 10 may be sub-divided into a foreground process and a background process. The foreground process includes the collection, processing, and correction of inertially derived measurements and the propagation and correction of spacecraft attitude data. The background process includes the collection of star position data, the comparison of star position data to the inertially based estimate of spacecraft attitude, and the subsequent apportionment of total error (i.e., the difference between the inertially derived attitude and the star position based attitude) among the aforementioned error terms that are used to provide the corrected attitude data 58.

The processing/control sub-system 59 may be implemented using a specially programed general purpose microprocessor, or may be implemented using an ASIC, or some combination of software and hardware. Although the present invention may be implemented using various combinations of hardware and software, in the preferred embodiment the processing/control sub-system 59 is implemented using real-time software executed by a general purpose microprocessor.

Additionally, the various processing blocks of the processing/control sub-system 59 preferably operate in real-time on board the spacecraft. Those skilled in the art will recognize, however, that some or all of these processing blocks may be operating in a post-processing mode so that the their processing results are periodically available, and/or may be remotely located on the ground, for example, so that their processing results are transmitted to the spacecraft on a continuous or periodic basis.

The gyros sub-system 12 preferably includes at least three gyros that each correspond to one of three mutually orthogonal axes, for example, the pitch, roll, and yaw axes of the spacecraft. The gyros 12 produce a plurality of output signals 16 that are provided to the processing/control sub-system 59. The gyro output signals 16 represent inertial data with respect to the three orthogonal axes and may include various types of errors such as bias or offset errors.

The star-tracker sub-system 14 provides star position data 18 using known techniques. For example, the star trackers 14 may be embodied in one or more digital cameras based on charge coupled devices (CCD). The star position data 18 may be represented using H(i), V(i) for the horizontal and vertical grid locations of a star (i) within the star trackers 14 FOV. The star position data 18 typically contains errors including LSF errors.

The processing/control sub-system 59 further includes a gyro data processing block 20, a gyro data correction block 26, a star-tracker data processing block 22, a star tracker LSF error correction block 23, an augmented extended Kalman filter block 40, and an attitude propagation block 34, all of which communicate as shown in FIG. 1.

The gyro data processing block 20 receives the output signals 16 from the gyro sub-system 12 and processes them in accordance with the specific gyro hardware using known techniques. For example, gyro hardware is commonly available as a modular unit that includes a data port providing digital data representative of gyro angles. The gyro data processing block 20 produces a pre-processed gyro data signal 24 that is provided to the gyro data correction block 26. The pre-processing provides the data in a format that is compatible with subsequent processing blocks. For example, the pre-processing may convert the gyro data to a floating point number format.

The gyro data correction block 26 receives the corrected gyro data 24 and represents it as a 3×1 gyro rate vector, denoted for purposes of discussion by $\omega_m$. A gyro rate vector is a rate measurement taken from a rate-measurement gyro, or alternatively, delta or incremental angles taken from a rate-integrating gyro. The gyro rate vector $\omega_m$ is a measured value that typically contains gyro bias errors as described above. The correction block 26 additionally receives a gyro bias error estimate 30 from the Kalman filter block 40. The bias error estimate 30 is represented as a 3×1 vector denoted by b. The gyro data correction block 26 produces a corrected gyro rate vector (denoted by $\omega_c$) using the bias error estimate b as shown in Equation 1 below. As Equation 1 shows, the bias error estimate 30 is subtracted from the gyro rate vector.

$$\omega_c = \omega_m - b \quad \text{(Equation 1)}$$

The corrected gyro rate vector $\omega_c$ is provided as corrected gyro data 32 to the attitude propagation block 34.

The attitude propagation block 34 receives the corrected gyro data 32 and attitude correction data 36 that is provided by the Kalman filter block 40. The attitude correction data 36 is well known to those of ordinary skill in the art. In known manners, the attitude propagation block 34 applies the attitude correction data 36 to the corrected gyro data 32 and integrates the resulting corrected data to produce corrected attitude data 58. The corrected attitude data 58 may be represented as a coordinate transformation matrix such as a directional cosine matrix. As is known, coordinate transformation matrices allow vectors (e.g., gyro rate vectors) to be related between different reference frames (e.g., an earth centered inertial (ECI) frame and a spacecraft body frame).

The star-tracker data processing block 22 receives the star-tracker data 18 and provides corrected star position data 38 to the star tracker LSF error correction block 23. The star-tracker data processing block 22 uses conventional, well-known data processing techniques to process the star-tracker data 18 and may, for example, correct aberrations in star position measurements and perform a direct match identification of stars using an on-board star catalog (OSC).

The star tracker LSF error correction block 23 receives the corrected star position data 38 and further processes the data in accordance with the present invention to correct LSF errors. Those skilled in the art will readily appreciate that conventional attitude determination systems do not include the functionality of the LSF error correction block 23. Furthermore, it can be readily appreciated that because conventional Kalman filters are unable to effectively filter LSF errors, the accuracy of the attitude estimates provided by these conventional systems is degraded.

In general, the LSF error correction block 23 uses an adaptive LSF error model to correct LSF errors in the attitude determination system 10. LSF error model parameters are selected to minimize the number of terms needed to achieve a desired level of accuracy. In operation, the Kalman filter 40 apportions some of the total attitude error into LSF error and provides LSF correction data 28 to adaptively correct the LSF error.

The LSF error correction block 23 receives the corrected star position data 38 from the star tracker data processing block 22, the LSF correction data 28 from the Kalman filter 40, and provides LSF corrected star position data 29 to the Kalman filter 40. As will be discussed in more detail below, the Kalman filter 40 is augmented according to the present invention to apportion some of the total attitude error into LSF error. Those skilled in the art will recognize that although many of the processing functions carried out within the Kalman filter 40 are known, the filter has been substantially augmented to correct LSF errors, which provides dramatically superior attitude estimation accuracy as compared to that provided by conventional (non-augmented) Kalman filters.

The Kalman filter block 40 receives the LSF corrected star position data 29 and the attitude data 58, and generates the gyro bias correction data 30, the attitude correction data 36, and the LSF correction data 28. The Kalman filter block 40 further includes, an augmented Kalman filter (AKF) covariance propagation update/gain computation section 52, an LSF error states section 46, and an attitude/traditional bias states section 42.

The AKF covariance propagation block 52 receives the spacecraft attitude data 58 and produces a 6×2 attitude and bias gains matrix 54 denoted by $K_1(k)$ and an N×2 (where N represents the number of LSF error model parameters) LSF error matrix 56 denoted by $K_2(k)$. $K_1(k)$ and $K_2(k)$ are time varying matrices evaluated at time k. The attitude and bias gains matrix 54 $K_1(k)$ and the LSF error matrix 56 $K_2(k)$ provide coefficients that are adaptively and dynamically adjusted to minimize total attitude error in the esti-mated spacecraft attitude data 58. As described in more detail below, the AKF covariance propagation block 52 generates A, H, Q, and R matrices, and uses these matrices in conjunction with standard well-known Kalman filter algorithms to generate the time varying matrices $K_1(k)$ and $K_2(k)$.

As is known in the art, A, H, Q, and R denote standard parametric matrices for use with Kalman filtering algorithms. As apparent to one of ordinary skill in the art, implementing the augmented Kalman filter 40 of the disclosed embodiment requires appropriately augmented A, H, Q, and R matrices that model the additional filter states (i.e., LSF errors), along with the standard six states (i.e., gyro bias and attitude errors). While the present disclosure provides particular augmented A, H, Q & R matrices (equations 6–10), details about the derivation of these matrices have not been provided because such derivations utilize standard mathematical techniques, the implementation of which is well within the capabilities of one of ordinary skill in the relevant art(s) and form no part of the present invention.

Equations 6–10 below disclose particular A, H, Q, and R matrices that are used with the above described embodiment of the present invention. These matrices are input to standard Kalman filtering algorithms, thereby generating corrective data (28, 30 & 36 shown in FIG. 1) that are used to improve the spacecraft attitude data 58 in accordance with the present invention. Some higher level details about how the matrices A, H, Q, & R are processed using the aforementioned standard Kalman filtering algorithms are provided later in this disclosure. Details beyond those provided herein are not discussed as such details are well within the abilities of those skilled in the relevant art(s) and form no part of the present invention.

The present invention models the LSF errors and uses the augmented Kalman filter 40 to apportion some of the total attitude error to LSF error, and to adaptively update the coefficients of the LSF error model to correct LSF errors. In particular, the LSF errors are preferably represented within two parameterized vectors that represent horizontal ($H_{LSF}$) and vertical ($V_{LSF}$) star position LSF errors respectively. These vectors are shown generally by Equations 2 and 3 below.

$$H_{LSF} = \rho^T [\phi_1(h,v), \phi_2(h,v) \ldots \phi_k(h,v)]^T = \rho^T \phi(h,v) \quad \text{(Equation 2)}$$

$$V_{LSF} = q^T [\phi_1(h,v), \phi_2(hv), \ldots \phi_k(h,v)]^T = q^T \phi(h,v) \quad \text{(Equation 3)}$$

The function family $\phi_k(h,v)$ are base functions that are linearly independent over the trajectory of interest (i.e., the trajectory through which the spacecraft is maneuvering) and may be mutually orthogonal. These base functions are selected to accurately model LSF errors with the minimum number of terms. For example, these base functions may be 2-D polynomials, 2-D Fourier series, or 2-D wavelets. As described in more detail below, the coefficient vectors $\rho$ and $q$ are estimated by the Kalman filter 40 to characterize the star tracker LSF errors.

The Kalman filter 40 of the present invention is augmented to include additional states representing the horizontal and vertical LSF errors of one or more star trackers. Thus, the augmented state vector for the Kalman filter 40 may be generally represented as shown in Equations 4 and 5 below.

$$Z = [X^T, \rho_1^T, q_1^T]^T \text{ (if one star tracker is used)} \quad \text{(Equation 4)}$$

$$Z = [X^T, \rho_1^T, q_1^T, \rho_2^T, q_2^T]^T$$
$$\text{(if two star trackers are used)} \quad \text{(Equation 5)}$$

Where $X^T$ is the state vector of the Kalman filter 40 before augmentation and includes gyro bias and attitude errors, and Z is the augmented state vector that includes additional states representing the LSF errors from the star trackers 14. Those skilled in the art will recognize that additional star trackers 14 may be used and included in the augmented state vector Z by including additional ρ and q vector pairs for each additional star tracker.

The A matrix is represented within the AKF covariance propagation block 52 as shown in Equation 2 below.

$$A(t) = \begin{bmatrix} A1 & 0 \\ 0 & 0 \end{bmatrix} \quad \text{(Equation 6)}$$

Where A1 is the "A" matrix for an unaugmented Kalman filter (i.e., including only gyro bias and attitude states). The "0s" represent zero matrices having the proper dimensions.

In the case of a system having two star trackers, the H matrix is represented within the AKF covariance propagation block 52 as shown in Equations 7 and 8 below.

$$[H_1, \gamma^T(h,v), 0] \text{(for tracker 1 measurements)} \quad \text{(Equation 7)}$$

$$[H_1, 0, \gamma^T(h,v)] \text{(for tracker 2 measurements)} \quad \text{(Equation 8)}$$

Where $$\gamma(h, v) = \begin{bmatrix} \phi(h, v) & 0 \\ 0 & \phi(h, v) \end{bmatrix}$$

and $H_1$ is the un-augmented "H" matrix of the Kalman filter 40.

The Q matrix is represented in the AKF covariance propagation using Equation 9 below.

$$Q = \text{Block diag } (Q_1, Q_{LSF})\Delta t \quad \text{(Equation 9)}$$

Where $Q_1$, is the "Q" matrix for the un-augmented Kalman filter and $Q_{LSF}$ models the random walk (i.e., the slow variation of the parameters over time), which is typically given by a diagonal matrix of the LSF error model parameters.

The R matrix is represented in the AKF covariance propagation block 52 using Equation 10 below.

$$R = \text{diag}(\sigma^2_H, \sigma^2_V) \quad \text{(Equation 10)}$$

The R matrix represents the measurement covariance matrix for the star position measurement of interest.

Using the A, H, Q, and R matrices determined using Equations 6 through 10 above, the AKF covariance propagation/update/gain computation block 52 implements a known Kalman filter algorithm to produce a gain matrix K. The gain matrix K is further partitioned using known techniques into the 6×2 attitude and bias gains matrix 54 $K_1(k)$ and the N×2 LSF error matrix 56 $K_2(k)$ discussed above.

The traditional attitude and gyro bias states section 42 receives the bias gains matrix 54 $K_1(k)$ and the LSF corrected star position data 29 denoted by ŷ. The traditional attitude and gyro bias states section 42 compares the LSF corrected star position data 29 to a predicted star position (denoted as y) derived from the inertial-based attitude data 58. The traditional attitude and gyro bias states section 42 then apportions some of the total error (y−ŷ) into attitude error/correction data 36 (δθ(k)) and gyro bias correction data 30 (δb(k)) using Equations 11 and 12 below in sequence.

$$X_1(k) = \begin{bmatrix} \delta\theta(k) \\ \delta b(k) \end{bmatrix} = K_1(k)(y - \hat{y}) \quad \text{(Equation 11)}$$

$$b(k) = b(k-1) + \delta b(k) \quad \text{(Equation 12)}$$

The LSF error section 46 receives the LSF error matrix data 56 ($K_2(k)$) and the LSF corrected star position data 29. The LSF error states section 46 compares the corrected star position data 29 to the predicted star position and apportions some of the total error into LSF errors to produce the LSF correction data 28 (i.e., vector g(k)) using Equations 13 and 14 below in sequence.

$$X_2(k) = K_2(k)(y - \hat{y}) \quad \text{(Equation 13)}$$

$$g(k) = g(k-1) + X_2(k) \quad \text{(Equation 14)}$$

Thus, the above described attitude determination system 10 compares the spacecraft attitude derived from gyros (i.e., inertial data) to the spacecraft attitude determined by the star-trackers 14. The resulting total error is apportioned into attitude, gyro bias, and LSF corrective data 28, 30, 36 using the adaptive time varying coefficient matrices $K_1(k)$ and $K_2(k)$ generated by the Kalman filter 40. The corrective data 28, 30, 36 is used as corrective feedback to the attitude determination system 10 via the gyro data correction block 26, the star tracker LSF error correction block 23, and the attitude propagation block 34.

In operation, the control flow through the various subsystems and process blocks of the present invention may be sub-divided into a foreground process and a background process. The foreground process includes the collection, processing, and correction of inertially derived measurements and the propagation and correction of spacecraft attitude data. Namely, the gyros sub-system 12, the gyro data processing block 20, the gyro data correction block 26, and the attitude propagation block 34 together with the gyro bias corrective data 30, and the attitude corrective data 36 provides the inertially derived corrected attitude 58. The background process includes the collection of star position data, the correction of star position data (including LSF error correction), the comparison of LSF corrected star position data to the inertially based estimate of spacecraft attitude, and the subsequent apportionment of total residual attitude error to star tracker LSF errors, bias errors, and attitude errors within the Kalman filter block 40.

The foreground and the background processes are essentially independent but are linked through an exchange of data. The foreground process provides the inertial-based attitude measurement 58 to the background process. The background process uses this inertial-based attitude measurement 58 along with an attitude measurement based on star positions to provide the foreground process with correction parameters. Thus, the background process provides the foreground process with multiple corrective feedbacks that are adaptively varied and which are ultimately referenced to absolute star positions.

The foreground and background processes do not have to execute at the same rate. In the preferred embodiment, the execution rates of the two processes may be optimized to achieve the desired dynamic control characteristics at the lowest cost. For example, the dynamic spacecraft control needed may require the foreground process to execute at a rate of 10 Hz. To make economical use of available processing power the background process may be executed at a much slower rate, for example, at 0.5 Hz.

Figure 2:
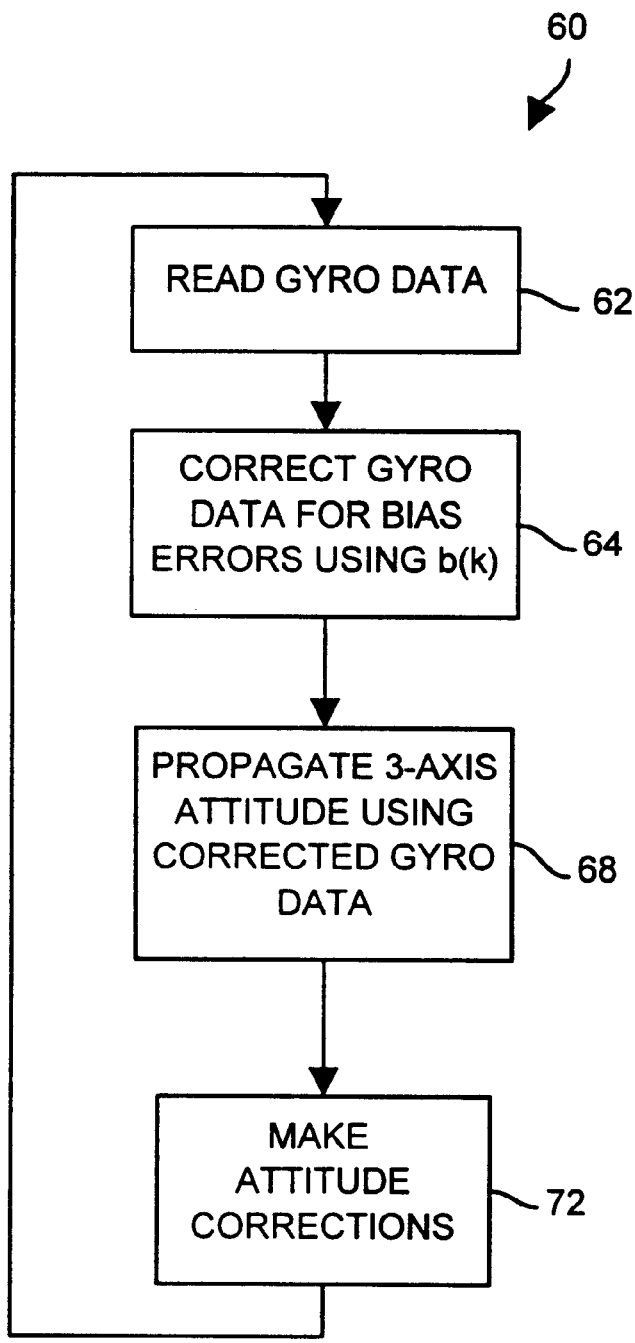
FIG. 2 is a flow diagram depicting the foreground control process of the present invention.

Illustrated in FIG. 2 is a flow diagram depicting in more detail the control flow of the foreground process 60 of the present invention. In a first block 62 the gyro data is acquired. A second block 64 uses the time varying vector b(k) to correct the gyro data for bias errors. A third block 68 propagates (i.e., integrates) the gyro data that has been corrected for bias errors. If the attitude errors are non-zero, a fourth block 72 makes the necessary corrections to the attitude data. If there are no attitude errors or after leaving the fourth block 72 the process 60 repeats itself beginning at the first block 62.

Figure 3:
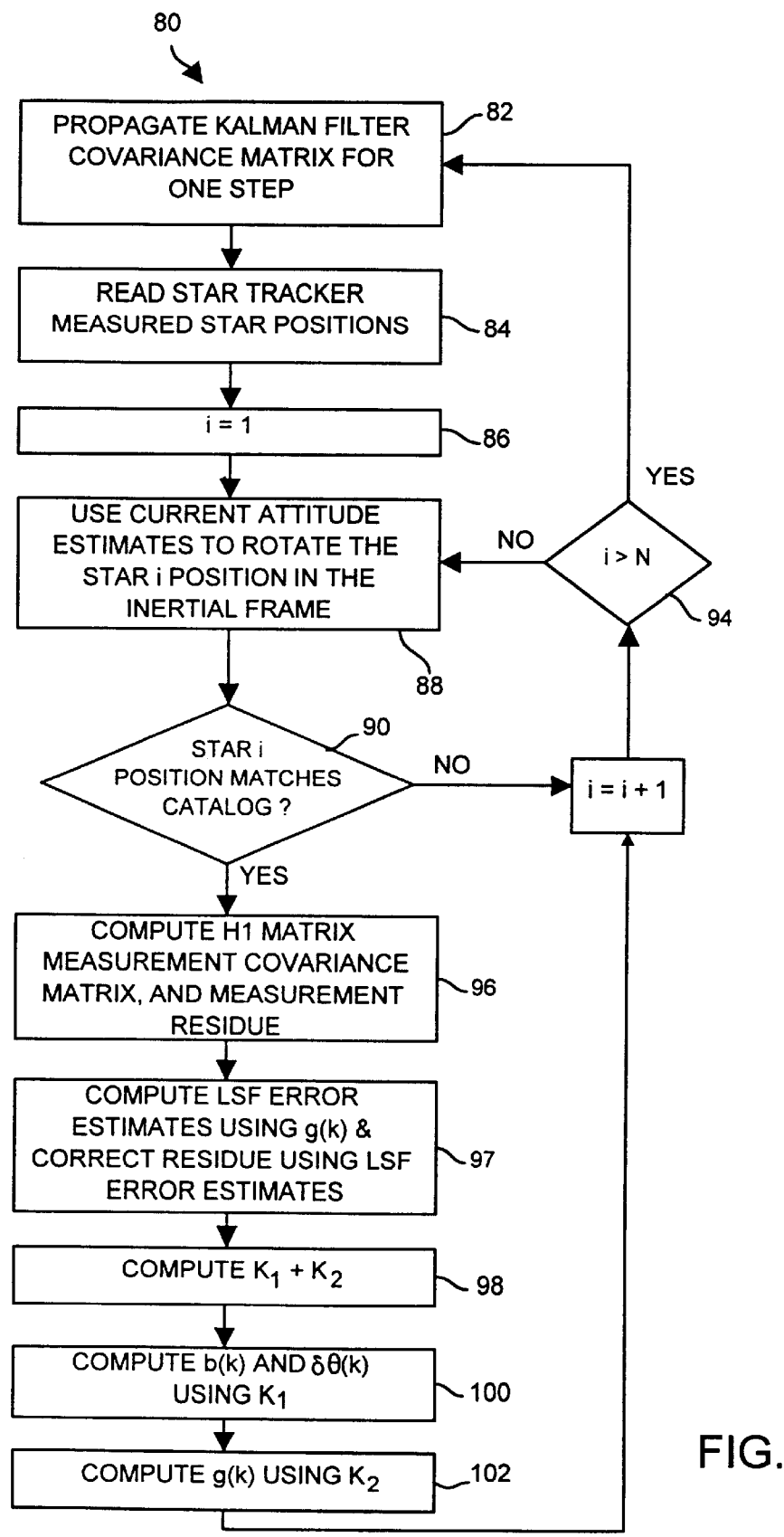
FIG. 3 is a flow diagram depicting the background control process of the present invention.

Illustrated in FIG. 3 is a flow diagram depicting in more detail the control flow of the background process 80 of the present invention. A first block 82 propagates, using known techniques, the Kalman filter covariance matrix for one step. A second block 84 acquires the star positions from the star tracker. A third block 86 initializes a star counter to one. A fourth block 88 uses the current attitude estimate to rotate the current star position (i.e., star i) in the inertial frame. A fifth block 90 determines if the current star position matches the on-board star catalog. If the current position of star i matches the star catalog, a sixth block 96 computes the A, H, Q, and R matrices as described in detail above, a seventh block 97 computes the LSF error estimates using g(k) and uses the error estimates to correct the residue. An eighth block 98 computes time varying matrices $K_1(k)$ and $K_2(k)$, and a ninth block 100 uses $K_1(k)$ to compute b(k) and $\delta\theta(k)$. A tenth block 102 computes g(k) using $K_2(k)$. Following the tenth block 102, or if the fifth block 90 determines that the current star is position does not match the on-board star catalog, an eleventh block 92 increments the star counter to the next star. A twelfth block 94 checks if all stars (N) have been processed. If there are more stars to process the process 80 reenters the fourth block 88. If all stars have been processed the process 80 repeats by reentering the first block 82.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A system for correcting star tracker low spatial frequency errors in stellar-inertial attitude determination systems, comprising:
   at least three inertial sensors;
   a stellar position sensor;
   a digital filter adapted to receive stellar-based attitude information derived from the stellar position sensor and inertial-based attitude information derived from the inertial sensors, the filter further being adapted to compare the stellar-based attitude information to the inertial-based attitude information to produce corrective data signals that represent low spatial frequency errors; and
   a means for correcting the stellar-based attitude information using the corrective data signals that represent low spatial frequency errors.

2. The system of claim 1, wherein the inertial sensors are uniquely associated with mutually orthogonal axes.

3. The system of claim 2, wherein the inertial sensors are gyros.

4. The system of claim 1, wherein the stellar position sensor is a star tracker.

5. The system of claim 1, wherein some of the corrective data signals are adapted to correct star tracker low spatial frequency errors.

6. The system of claim 1, wherein some of the corrective data signals are adapted to correct gyro bias errors.

7. The system of claim 1, wherein some of the corrective data signals are adapted to correct attitude errors.

8. The system of claim 1, wherein the corrective data signals comprise coefficients arranged in at least two matrices.

9. The system of claim 8, wherein the digital filter adaptively adjusts the coefficients to minimize total attitude error.

10. The system of claim 1, wherein the digital filter is a Kalman filter.

11. The system of claim 10, wherein the Kalman filter has some states associated with low spatial frequency errors.

12. A method of correcting the low spatial frequency errors in a stellar-inertial attitude determination system, comprising the steps of:
   (a) comparing inertially-based attitude information to stellar-based attitude information to determine a total attitude error and a portion of the total attitude error that is representative of low spatial frequency errors;
   (b) generating first and second coefficient matrices based on the total attitude error a portion of which is representative of low spatial frequency errors;
   (c) receiving stellar position information from one or more stellar position sensors;
   (d) correcting the stellar position information using the first coefficient matrix;
   (e) receiving inertial information from one or more inertial sensors;
   (f) correcting the inertial information using the second coefficient matrix;
   (g) propagating an attitude using the corrected inertial information to produce a propagated attitude estimate; and
   (h) correcting the propagated attitude estimate using the second coefficient matrix.

13. The method of claim 12, wherein the generating step(b) comprises generating the coefficient matrices using an augmented Kalman filter.

14. The method of claim 13, wherein the augmented Kalman filter comprises states associated with low spatial frequency errors.

* * * * *